United States Patent [19]

Sakai et al.

[11] Patent Number: 4,475,374
[45] Date of Patent: Oct. 9, 1984

[54] SMALL PRESS

[75] Inventors: Yasuharu Sakai, Kyoto; Kazuhiro Matsui, Aichi, both of Japan

[73] Assignees: Japan Storage Battery Limited; Proto Planning Co., both of Japan

[21] Appl. No.: 352,436

[22] Filed: Feb. 25, 1982

[30] Foreign Application Priority Data

Feb. 27, 1981 [JP] Japan .................................. 56-28961
Feb. 27, 1981 [JP] Japan .................................. 56-28962
Feb. 27, 1981 [JP] Japan .................................. 56-28963
Feb. 27, 1981 [JP] Japan .................................. 56-28964
Feb. 27, 1981 [JP] Japan .................................. 56-28965

[51] Int. Cl.³ .............................................. B21J 9/18
[52] U.S. Cl. ........................................ 72/452; 72/407;
72/453.15; 29/243.56; 74/54
[58] Field of Search .................. 72/452, 407, 453.15,
72/453.16, 412, 415; 29/243.56, 243.57; 74/54,
569; 83/602, 604, 605, 628

[56] References Cited

U.S. PATENT DOCUMENTS 2,208,058 7/1940 Smith ................................... 72/407

FOREIGN PATENT DOCUMENTS 269873 11/1950 Switzerland ......................... 72/452

Primary Examiner—Daniel C. Crane
Assistant Examiner—David B. Jones
Attorney, Agent, or Firm—Sughrue, Mion, Zinn, Macpeak & Seas

[57] ABSTRACT

A small press or cutting die assembly includes a small prime mover and suitable reduction gearing for driving an eccentric cam. A rockable lever bears on the cam either directly or through intermediate means, the lever being used to drive the pressing or cutting die assembly which is connected through shafts to the rocking lever and a stationary reaction member, respectively.

5 Claims, 7 Drawing Figures

SMALL PRESS

BACKGROUND OF THE INVENTION

This invention relates to a small press using a small pressing or cutting die assembly such as a die assembly for attaching terminals to lead wires under pressure, for cutting rods or electric wires, or for caulking rivets.

Heretofore, a handy and strong power transmitting means has not been available for a small pressing or cutting press.

SUMMARY OF THE INVENTION

The invention is intended to provide a strong, small, light weight press, which uses a small prime mover such as an electric motor, a pneumatic motor or hydraulic motor as a drive source.

The small press according to the invention is designed so that the small prime mover as described above is employed as the power source, a reduction gear or the like is used to obtain suitable torque, a rocking lever is mounted on a fulcrum shaft installed on a stationary lever, and a power transmitting portion (the rear end portion of the rocking lever) is slidably in contact with a cam which is driven by the prime mover to generate eccentric rotation, so that the rotation of the cam is converted into the rocking motion of the rocking lever, thereby to operate a pressing or cutting die assembly which is coupled through shafts to the front end portions of the rocking lever and the stationary lever.

According to the invention, in order to reduce the slide resistance between the rocking lever and the cam, a slide plate may be disposed between the power transmitting portion of the rocking lever and the cam in such a manner that it is linearly reciprocated as the cam is turned. A contact roll may be rotatably coupled to the power transmitting portion of the rocking lever, and the eccentric cylindrical cam, on which a slide ring is placed, is provided with an interposed bearing member.

In a further embodiment according to the invention, the amount of eccentric motion of the cam is set so that the engaging portions of the die assembly are closed before the power transmitting portion of the rocking lever reaches the top dead center of the cam, and, by the additional motion of the power transmitting portion which is effected until the cam reaches top dead center, at least one portion of the die assembly, the stationary lever or the rocking lever is bent.

Also according to the invention, to assist in distributing the load, and in maintaining accurate positional relationships among the elements, the stationary lever may be secured to a gear casing by connecting the lower portion thereof to the gear casing with a positioning shaft which is parallel to the fulcrum shaft and by connecting the upper portion of the stationary lever to the casing with bolts which are screwed thereinto perpendicularly to the fulcrum shaft, the lower and the upper portions of the stationary lever being respectively below and above the fulcrum shaft.

Finally, for security in operation, the rocking lever may be maintained biased by a spring so that the engaging portions of the die assembly are closed, and a push rod for pushing the power transmitting portion of the rocking lever may be provided; where only when a material to be pressed or cut is to be inserted between the engaging portions of the die assembly is the push rod operated to open the engaging portions, and after the material has been inserted therebetween, the die assembly is closed by means of the spring. Then, the material is pressed or cut by operating the prime mover. This arrangement is designed to prevent an accident wherein a user's finger may be clamped by the die assembly.

DETAILED DESCRIPTION OF THE PREFERRED EMBODIMENTS

Figure 1:
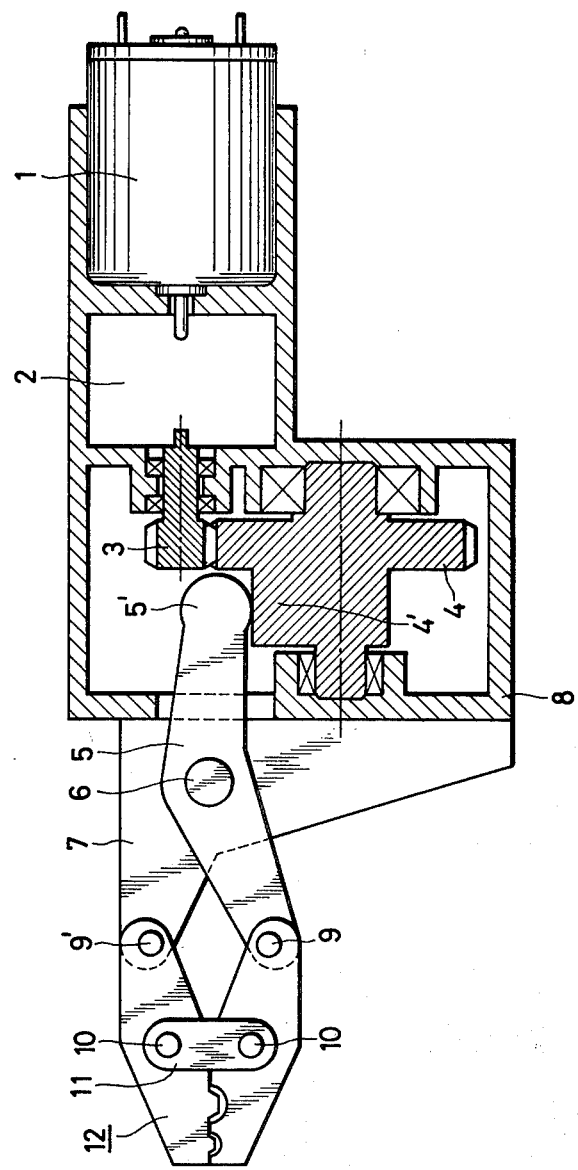
FIG. 1 is a sectional view of a first embodiment of the invention.

In FIG. 1, reference numeral 1 designates an electric motor, the output shaft of which is coupled to a reduction gear 2. Thus, a pinion 3 is rotated, through the reduction gear 2, by the motor 1. The pinion 3 is engaged with a power transmission gear 4. While the speed of the motor 1 is being reduced by a suitable reduction gear ratio of the reduction gear 2, the torque of the motor 1 is transmitted through the pinion 3 to the power transmission gear 4. One side portion of the power transmission gear 4 is formed as an eccentric cylindrical cam 4' which rotates eccentrically when the gear 4 is rotated. Further in FIG. 1, reference numeral 5 designates a rocking lever whose rear end portion serves as a power transmitting portion 5'. The power transmitting portion 5' is in contact with the eccentric cylindrical cam 4', and the rocking lever 5 is mounted on a fulcrum shaft 6 which is embedded in a stationary lever 7 secured to the gear casing 8, so that the rocking lever 5 rocks around the shaft 6 as the cam rotates. One end portion of one of two die pieces, which form a die assembly 12 for attaching a terminal to a lead wire under pressure, is coupled through a shaft 9 to the front end portion of the rocking lever which is opposite to the rear end portion, or the power transmitting portion 5', on the eccentric cylindrical cam 4'. Similarly, one end portion of the other die piece is coupled through a shaft 9' to the front end portion of the stationary lever 7 which journals the rocking lever. Reference numeral 10 designates a pair of fixing shafts which fix the lever portions of the die pieces (12). More specifically, the fixing shafts 10 in combination with a fixing plate 11 positively hold the positional distance between the lever portions of the die pieces (12), while permitting relative rocking motion.

When a power switch (not shown) is turned on, the electric motor 1 is rotated, and the pinion 3 is turned through the reduction gear 2.

As the pinion 3 is engaged with the power transmission gear 4, the latter is rotated, and accordingly the eccentric cylindrical cam 4' formed on the side of the gear 4 is turned. The rocking lever 5 is operated, following the contours of the eccentric cylindrical cam 4', the cam being rotated from the bottom dead center position toward the top dead center position. Accordingly, the rocking lever 5 is rocked about the fulcrum shaft 6. As the rocking lever 5 is rocked in this manner, the die pieces of the die assembly 12, which are coupled through the shafts 9 and 9' to the front end portion of the rocking lever 5 and the front end portion of the stationary lever 7, respectively, are turned about the fixing shafts 10, respectively; to engage the die pieces with each other under pressure. As the rocking lever 5 is integrally coupled through the fulcrum shaft 6 to the stationary lever 7, the friction of the rocking lever 5 is low, and accordingly the rocking lever 5 can transmit power effectively. As the stationary lever is secured to the gear casing 8 and the fulcrum shaft 6 is installed on the stationary lever, the rocking lever operates on the supporting part which supports the shaft of the power transmission gear 4 in the gear casing. Therefore, if the supporting part and the fulcrum shaft on the stationary lever are manufactured in such a manner that the relation therebetween is accurate, then a certain assembling relation may be established and a mechanism high in accuracy can be readily assembled at any time. Only when the eccentric cylindrical cam 4' is operated from the bottom dead center towards the top dead center is the rocking lever 5 restricted by the eccentric cylindrical cam 4', the fulcrum shaft 6 and the shaft 9.

Figure 2:
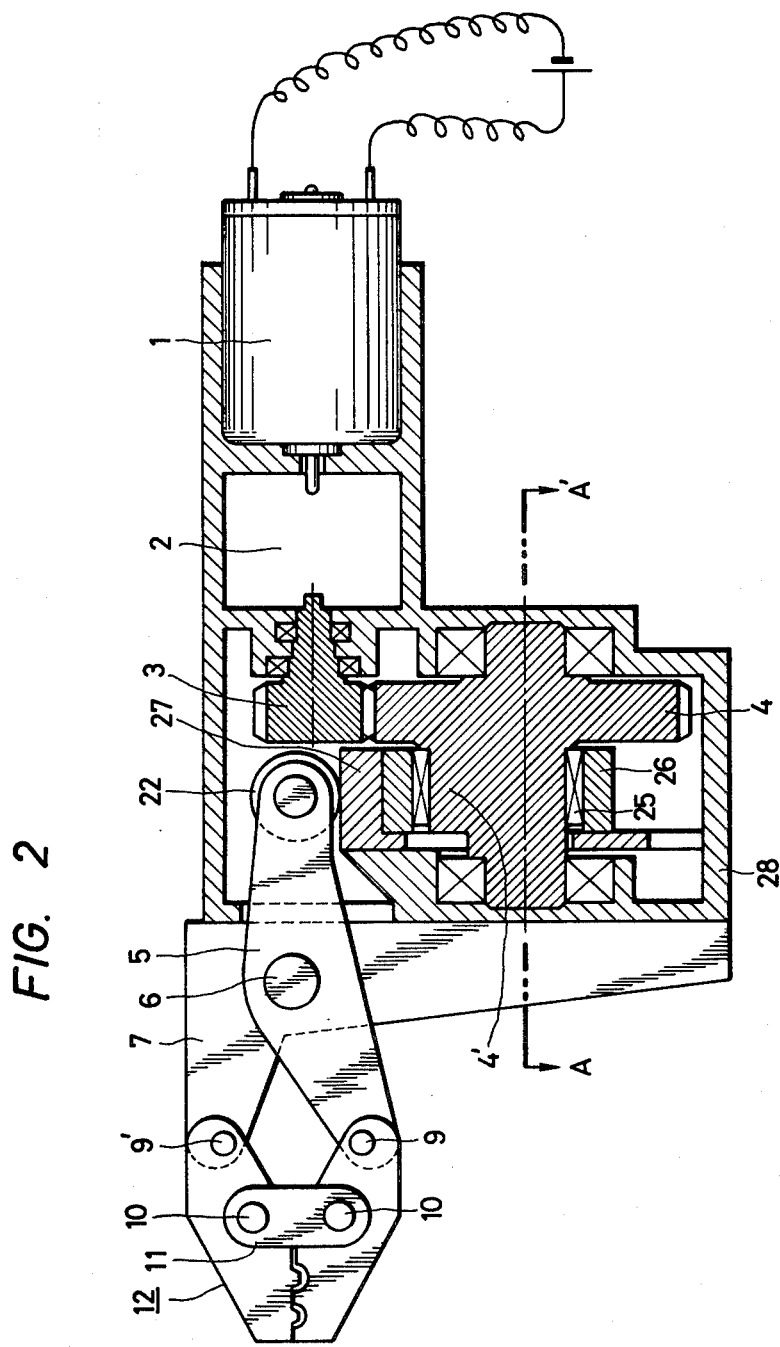
FIGS. 2 and 3 illustrate a modified form of the device of FIG. 1.
Figure 3:
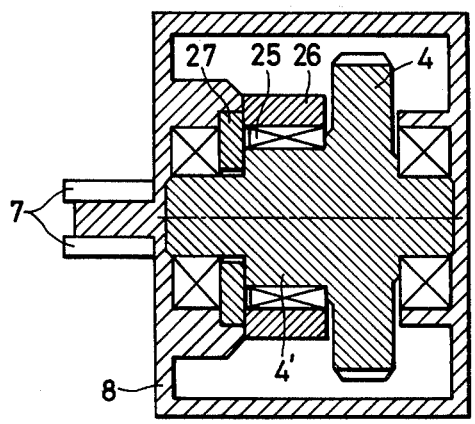

When the eccentric cylindrical cam 4' is in the bottom dead center region, the power transmitting portion 5' of the rocking lever 5 is a free end portion which is not restricted by the eccentric cylindrical cam 4'. Therefore, in this case, the rocking lever 5 can be externally rocked with ease, so that the die assembly may be readily opened or closed. In the embodiment of FIG. 2, a slide ring 26 is rotatably put on the eccentric cylindrical cam 4' with a needle bearing member 25 interposed therebetween. Further in FIG. 2, reference numeral 27 designates a slide plate which reciprocates between top dead center and bottom dead center as the slide ring 26 turns eccentricity. The member 27 is formed as an inverted-L-shaped plate, the upper horizontal plate portion being in contact with the slide ring 26, and a downwardly extended plate portion having a vertically elongated through-hole at the central portion into which the rotary shaft of the power transmission gear is loosely fitted. Both side portions of the slide plate 27 are engaged with slide guides which are formed in the gear casing 8, and are inserted between the bearing of the power transmission gear 4 and the end face of the eccentric cylindrical cam 4'. Thus, the slide plate 27 is designed so that even if the contact position between the lower surface of the horizontal plate portion and the slide ring 26 is shifted horizontally as the cam turns eccentrically, the slide plate 27 is moved linearly up and down while the horizontal plate portion is maintained horizontal.

The stationary lever is fixed secured to the front end of the gear casing 8, and the fulcrum shaft 6 extends perpendicularly to the shaft of the power transmission gear 4. The rear end power transmitting portion of the rocking lever is coupled to a contact roll 22 through a shaft in such a manner that the contact roll 22 is in contact with the slide plate 27. Therefore, as the slide plate is moved upwardly by the eccentric rotation of the cam 4', the contact roll 22 is also moved upwardly, and therefore the power transmitting portion of the rocking lever is turned upwardly about the fulcrum shaft. In this operation, the contact roll is moved forthwardly or backwardly, while turning, due to the horizontal displacement of the center of the contact roll.

When the electric motor 1 is connected to the electric source, the torque of the motor 1 is transmitted through the reduction gear 2 to the eccentric cylinderical cam 4' to turn the latter. As the cam 4' is turned, the slide ring 26 which is put on the cam 4' with the relatively thin needle bearing member 25 therebetween is also turned eccentrically, so that the slide plate 27 is reciprocated between top and bottom dead centers along the slide guides formed in the gear casing 8. The load which is applied to the slide plate 27 by the rocking lever is also applied to the eccentric cylindrical cam. However, the frictional loss which occurs between the eccentric cylindrical cam 4' and the slide ring 26 due to the load is greatly reduced by the rotation of the needle bearing member 25 inserted between the cam 4' and the slide ring 26. The slide plate 27 is reciprocated linearly between top and bottom dead centers of the eccentric cylindrical cam 4' while being restricted by the slide guides formed in the casing 8. Therefore, the mechanical loss which is caused when the slide ring 26 is turned through the needle bearing member 25 attributes only to the side pressure which is applied to the slide guides by the slide plate 27. The power which is generated by the eccentric cylindrical cam 4' is transmitted to the upper surface of the slide plate 27. Furthermore, the power is transmitted, as a uniform load, to the contact roll 12 of the rocking lever. That is, no eccentric load is applied to the rocking lever.

The power transmitting portion of the rocking lever is in contact with the upper surface of the slide plate 27, as described above. Therefore, as the slide plate 27 is driven towards the top dead center by the eccentric motion of the eccentric cylindrical cam 4', the rocking lever is turned about the fulcrum shaft 6 in a seesaw motion. In this operation, the contact line of the power transmitting portion of the rocking lever, which is in contact with the slide plate 27, is shifted on the upper surface of the slide 27 as much as the horizontal distance defined by the rotational angle of the rocking lever; that is, the contact line rubs the slide plate 27. However, since the contact roll 22 is rotatably coupled to the power transmitting portion of the rocking lever, which is in contact with the slide plate through the contact roll 22, when the eccentric cylindrical cam 4' pushes the contact roll 22 towards the top dead center, the contact roll is turned through an angle corresponding to the horizontal distance defined by the rotational angle of the rocking lever, thus greatly reducing the mechanical loss.

Figure 5:
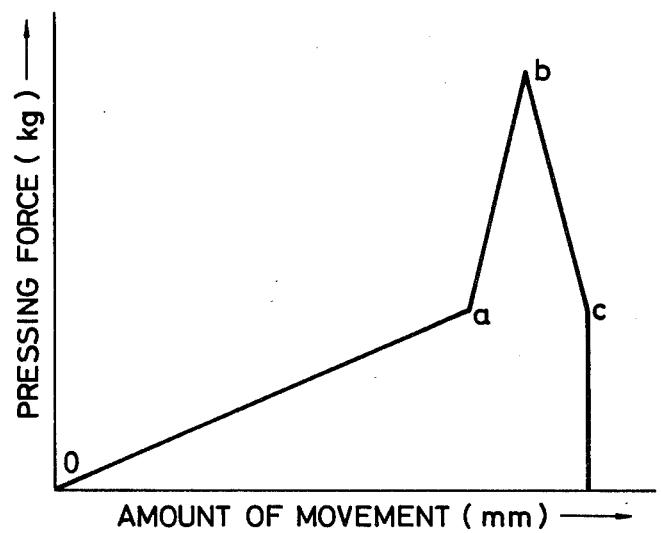
FIG. 5 is a pressure graph for use with the embodiment of FIG. 4.
Figure 4:
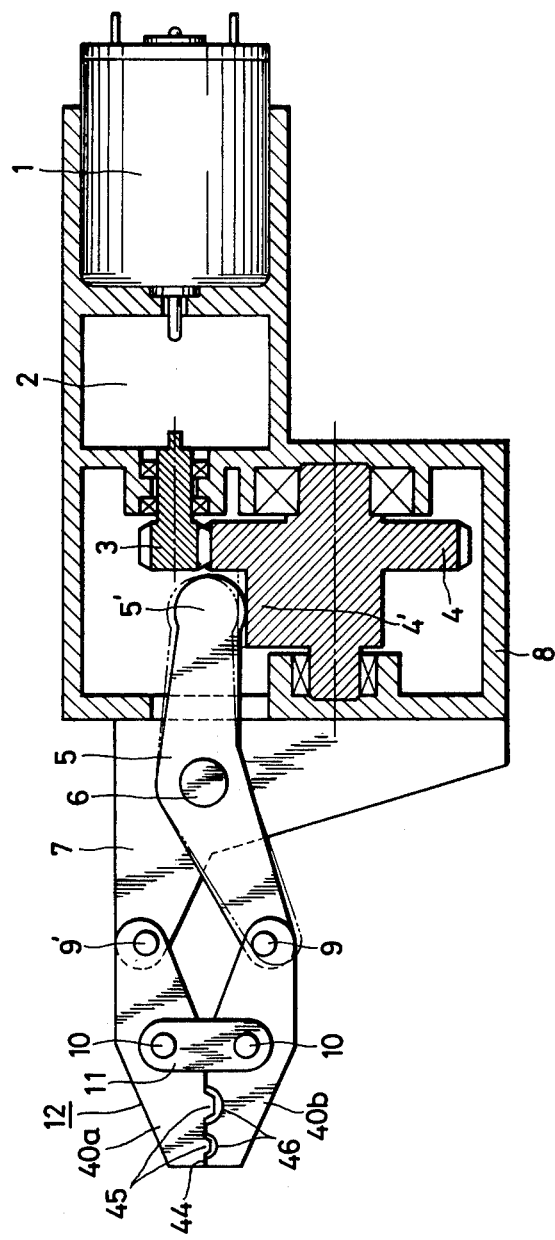
FIG. 4 illustrates a third embodiment of the press.

In the embodiment of FIGS. 4 and 5, die pieces 40*a* and 40*b* have engaging portions 44 which are closed when the die pieces are turned about the die shafts 10 as the rocking lever rocks. Pressing protrusions 45 extend from one of the engaging portions 44, to press a terminal (not shown) to be pressed thereby, and recesses 46 are formed in the other engaging portion 44. The protrusions 45 and the recesses 46 are designed so that they confront each other with a gap corresponding to the thickness of the terminal which has been pressed, when engaged. (In the invention, different protrusions and different recesses are provided so that different dimension terminals can be pressed.)

The press is designed as follows: before the power transmitting portion 5' of the rocking lever which is slidably in contact with the cam reaches the top dead center of the cam, the engaging portions 44 of the die assembly are closed. The top dead center of the cam is set so that, after a terminal has been pressed by the protrusion 45 and the recess 46, the power transmitting portion of the rocking lever (or the contact point of the power transmitting portion at which the latter is in contact with the cam) is further raised by 0.3 to 2.5 mm. By this additional movement of the power transmitting portion, which is effected as the cam reaches top dead center after the closure of the engaging portions 44, at least one portion of the rocking lever 5, stationary lever 7 or the die assembly 12 are bent as indicated by the dotted line in FIG. 4. This deformation is released, i.e., these members are elastically restored when the maximum eccentric point of the cam turns towards the bottom dead center, past the top dead center.

After the material to be pressed is inserted between the engaging portions 44 of the die assembly, the motor 1 is rotated. As the motor 1 is rotated, the power transmission gear is turned through the reduction gear 2 and the pinion 3, to eccentrically turn the cam. By the eccentric rotation of the cam, the rocking lever is swung about the fulcrum shaft, so that the material is pressed by the die pieces of the die assembly 12 which are coupled to the front end portions of the rocking lever and the stationary lever 7. FIG. 5 shows the relationship between pressure and movement of the contact point of the rocking lever's power transmitting portion on the cam when the die assembly presses an item inserted between the engaging portions of the die assembly. In FIG. 5, the line O-a indicates that the item inserted in the engaging portions of the die assembly is being pressed. At the point a, the pressing is completed and the engaging portions 44 are closed. The line a-b indicates that, after the pressing of the item has been completed, the engaging portions of the die assembly are closed and the rocking lever is further moved. During this period, the pressure is applied to the engaging portions of the die assembly and the amount of movement is absorbed as the rocking lever, the stationary lever and the die assembly bend. At the point b, the maximum eccentric point of the cam reaches top dead center and turns toward bottom dead center, whereupon the power transmitting portion of the rocking lever begins moving downwardly. At the point c, the deformation of the rocking lever and so forth are released; that is, the members are elastically restored. After the point c, the pressure is decreased to zero.

In general, when a mechanical device is operated under load for a long time, it is worn and permanently deformed. Therefore, the components of the press of the invention such as the cam, the rocking lever, the stationary lever, and the shafts are also worn and deformed when the small press is used over a long time. However, it is desirable that the small press be designed so that, even if the components are worn or permanently deformed, the pressing force of the die assembly is maintained unchanged. In the press of the invention, the cam and the rocking lever are so positioned that, after the engaging portions of the die assembly have been closed, the rocking lever is further moved, but the amount of additional movement is absorbed by the rocking lever, etc. Therefore, the pressing force of the die assembly can be maintained unchanged for a long period of time. In the small press of the invention, because of the additonal movement of the rocking lever, the pressing time of the die assembly is increased by the time interval which elapses from the instant that the rocking lever, etc. are bent until they are restored. Accordingly, the item is maintained pressed for a certain period of time after the pressing thereof has been completed. Therefore, in the case where the small press is used as a device for attaching terminals to wires under pressure, the spring-back of the material to be pressed, which may be caused immediately after the material has been subjected to plastic deformation, can be prevented, and accordingly the configuration of the pressed material can be maintained stable.

Figure 6:
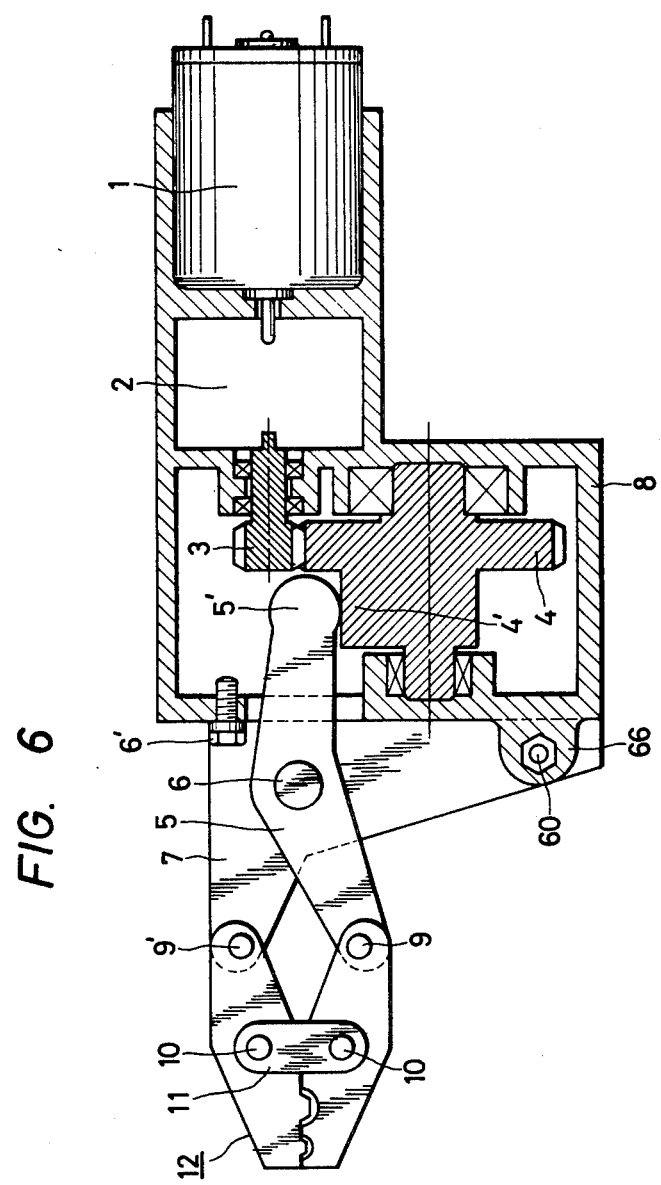
FIG. 6 illustrates a fourth embodiment.

Turning now to the embodiment of FIG. 6, a pair of shaft holding protrusions 66 are extended from the lower portion of the front end of the gear casing 8. A positioning shaft 60 is connected between the protrusions 66 in such a manner that it is parallel to the fulcrum shaft on the stationary lever, and is extended through the lower portion of the stationary lever to hold the same. The upper portion of the stationary lever is fixedly secured to that portion of the casing 8 which is above the fulcrum shart 6, with bolts 61 which are screwed thereinto perpendicularly to the fulcrum shaft.

Thus, the stationary lever is connected to the casing 8 through the positioning shaft 60 which extends below the fulcrum shaft and in parallel with the latter, and is further connected to the gear casing 8 with the bolts 61 which are screwed thereinto, above the fulcrum shaft, perpendicularly to the fulcrum shaft. Therefore, in assembling the small press, the stationary lever can be positioned by the positioning shaft 60 which is provided on the lower portion of the front end of the gear casing, so that the positional relationships of the various components such as the cam 4', the stationary lever 7 and the rocking lever 5 with respect to the casing 8 are maintained accurate. Thus, the small press can be assembled with high accuracy at all times. A reaction force is imparted on the stationary lever 7 through the fulcrum shaft 6 and the die assembly coupling shafts 9, 9' by the rocking lever when the die assembly presses an item. The reaction force merely acts to turn the stationary lever counterclockwise about the positioning shaft 60 and to give a tensile load to the bolts which connect the upper portion of the stationary lever to the casing. Thus, the manner of distributing the load to the casing is simple, which facilitates designing the casing mechanical strength.

Figure 7:
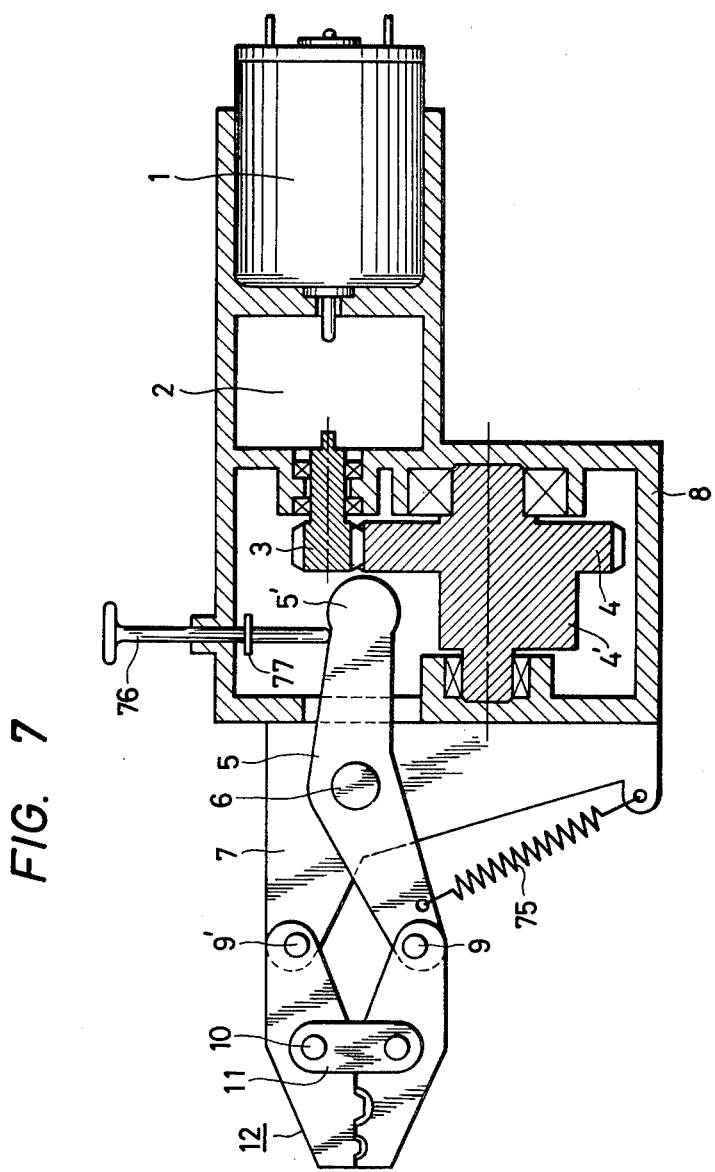
FIG. 7 illustrates an embodiment to which safety features have been added.

In the embodiment of FIG. 7, a coil spring 75 is connected between the front end portion of the rocking lever 5 and the lower end portion of the stationary lever 7, to pull the front end portion of the rocking lever 5 downwardly so that the engaging portions of the die assembly are normally closed. The small press further comprises a push rod 76 which slidably penetrates the upper wall of the gear casing 8. The push rod 76 is used to push the power transmitting portion 5' of the rocking lever against the cam 4' to open the die assembly. The lower end of the rod 76 is maintained in contact with the upper surface of the power transmitting portion 5'. The push rod 76 has a stopper 77 which prevents the push rod 76 from coming off the casing 8.

Any spring may be employed instead of the aforementioned coil spring if it elastically urges the rocking lever counterclockwise in FIG. 7. For instance, a spiral spring may be arranged around the fulcrum, or a spring may be arranged between the inner wall of the casing and the power transmitting portion so that the power transmitting portion is pulled upwardly. Furthermore, any means may be employed instead of the push rod if it allows the hand to push down the rocking lever's power transmitting portion. For instance, a push rod may be connected to the side of the power transmitting portion and a vertically elongated slit may be cut in the side wall of the gear casing so that the push rod is protruded outside through the slit.

The strength of the spring is set to the extent, that, when the push rod is depressed with the finger, the rocking lever is swung readily to open the die assembly, and when the push rod is released, the die assembly is maintained closed as long as an external force is not applied thereto.

With the arrangement as described, when the cam is in the bottom dead center region, the rocking lever's power transmitting portion 5' is free, being not restricted by the cam; however, since the rocking lever is elastically pulled by the spring 75, the engaging portions of the die assembly are maintained closed. Therefore, after the pressing operation has taken place, the pressed material is taken out by operating the push rod 76.

As the engaging portions of the die assembly in the small press of the invention are maintained closed, the danger that foreign matter or a user's finger may be clamped by the die assembly is prevented. Thus, the safety during work may be improved by the provision of this simple mechanism.

In the above-described embodiments of the invention, an eccentric cylindrical cam is employed; however, a cam of egg-shaped or elliptic section can be used. As was described in the introductory part of the specification, electric motors, pneumatic motors or hydraulic motors may be employed as the prime mover.

Furthermore, if instead of the pressing die assembly, a cutting die assembly is used, then the small press can be used to cut rod or electric wires. If a caulking die is connected to the small press, then the latter can be used as a rivet caulker. Thus, the small press can be used widely as a pressure tool.

As is apparent from the above description, the small press of the invention has a low number of components and number of power transmission stages, and therefore it is low in general mechanical loss. Furthermore, the press provided by the invention is small in size, small in weight and handy.

What is claim is:

1. A small press comprising a casing, a stationary lever mounted on said casing, a rocking lever pivotally mounted on said stationary lever by means of a fulcrum shaft, said rocking lever having one end thereof disposed within said casing, complementary tool means carried by said stationary lever on the other end of said rocking lever for movement into and out of pressure engagement, drive means mounted in said casing including rotatable shaft means having cam means thereon, a slide plate disposed between said one end of said rocking lever and said cam means such that said slide plate is reciprocated linearly as said cam means is turned and a contact roll rotatably mounted on said one end of said rocking lever in contact with said slide plate.

2. A press as set forth in claim 1 wherein said slide plate is carried on said cam means by bearing means interposed between said cam means and said slide plate.

3. A press as set forth in claim 1 wherein said cam means is comprised of an eccentric cam, the line of eccentric motion of said cam being set so that engaging portions of said tool means are closed before said one end of said rocking lever reaches the top dead center of said cam, and wherein at least one of said tool means and said levers is made of elastically deformable material to permit elastic deformation thereof upon movement of said one end of said rocking lever to the top dead center of said cam.

4. A press as set forth in claim 1 wherein said stationary lever is mounted on said casing by connecting the lower portion of said stationary lever to said casing through a positioning shaft parallel to said fulcrum shaft and mounted on the front end of said casing and by connecting the upper portion of said stationary lever to said casing with bolts extending perpendicularly to said fulcrum shaft, the lower and upper portions of said stationary lever being respectively located below and above said fulcrum shaft.

5. A press as set forth in claim 1 wherein said rocking lever is spring biased to close said complementary tool means and further comprising a push rod slidably mounted on said casing for pushing said one end of said rocking lever in the opposite direction against the force of said spring means.

* * * * *